United States Patent
Imaoka

(10) Patent No.: US 12,007,539 B2
(45) Date of Patent: Jun. 11, 2024

(54) PROJECTION LENS SYSTEM AND IMAGE PROJECTION DEVICE

(71) Applicant: Panasonic Intellectual Property Management Co., Ltd., Osaka (JP)

(72) Inventor: Takuya Imaoka, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 765 days.

(21) Appl. No.: 17/113,376

(22) Filed: Dec. 7, 2020

(65) Prior Publication Data

US 2021/0116688 A1  Apr. 22, 2021

Related U.S. Application Data

(63) Continuation of application No. PCT/JP2019/035494, filed on Sep. 10, 2019.

(30) Foreign Application Priority Data

Sep. 28, 2018 (JP) .................. 2018-183756

(51) Int. Cl.
  *G02B 15/14* (2006.01)
  *G02B 13/16* (2006.01)

(52) U.S. Cl.
  CPC ..... *G02B 15/143105* (2019.08); *G02B 13/16* (2013.01)

(58) Field of Classification Search
  CPC .................. G02B 15/143105; G02B 13/16

USPC ......................................................... 359/690
See application file for complete search history.

(56) References Cited

U.S. PATENT DOCUMENTS

| | | | |
|---|---|---|---|
| 4,377,325 A | 3/1983 | Hiroshi et al. | |
| 5,225,927 A | 7/1993 | Nozaki et al. | |
| 2011/0032606 A1 | 2/2011 | Imaoka | |
| 2014/0146216 A1 | 5/2014 | Okumura | |
| 2015/0092100 A1* | 4/2015 | Chen ................. | G02B 13/16 |
| | | | 348/349 |
| 2017/0276917 A1* | 9/2017 | Iwamoto .......... | G02B 15/20 |

FOREIGN PATENT DOCUMENTS

| | | |
|---|---|---|
| JP | 2011-53663 | 3/2011 |
| JP | 2014-106391 | 6/2014 |

(Continued)

OTHER PUBLICATIONS

Extended European Search Report dated Oct. 25, 2021 in corresponding European Patent Application No. 19864149.0.

(Continued)

*Primary Examiner* — George G. King
(74) *Attorney, Agent, or Firm* — WENDEROTH, LIND & PONACK L.L.P.

(57) ABSTRACT

A projection lens system is a projection lens system including a plurality of lens groups, the plurality of lens groups each including one or more lenses and moving such that an interval between the lens groups changes during a zooming action, the projection lens system including a first lens group disposed closest to a magnification side, the first lens group having positive power, wherein the first lens group includes one negative lens satisfying $0.0005<\Delta pgfn<0.01$ and $32<vdn<45$.

10 Claims, 7 Drawing Sheets

(56) References Cited

FOREIGN PATENT DOCUMENTS

| | | |
|---|---|---|
| JP | 2014-126766 | 7/2014 |
| JP | 6141005 | 6/2017 |

OTHER PUBLICATIONS

Japanese Office Action dated Mar. 7, 2023 in corresponding Japan Patent Application No. 2020-548367, with English machine translation.
International Search Report dated Nov. 12, 2019 in International (PCT) Application No. PCT/JP2019/035494.
International Preliminary Report on Patentability and Written Opinion of The Searching Authority dated Apr. 8, 2021 in International (PCT) Application No. PCT/JP2019/035494.

* cited by examiner

PROJECTION LENS SYSTEM AND IMAGE PROJECTION DEVICE

BACKGROUND

1. Technical Field

The present disclosure relates to a projection lens system in which an image on a reduction side is projected on a magnification side, and an image projection device including the projection lens system.

2. Related Art

JP 2011-053663 A discloses an optical system for satisfactorily correcting chromatic aberration in an image projection device and an imaging device and suppressing a shift in focus position due to a temperature change. In the optical system of JP 2011-053663 A, at least two positive lenses in which the Abbe number, the anomalous dispersion, the rate of change in refractive index with respect to temperature changes, etc. are set in appropriate ranges are provided closer to the reduction side than a diaphragm. As a result, while the width of the axial luminous flux is increased to favorably correct the axial chromatic aberration, the shift of the focus position caused by the change in the refractive index due to the temperature change is suppressed. JP 2011-053663 A cites a lamp used as a light source as a cause of high temperature in an image projection device.

SUMMARY

The present disclosure provides a projection lens system and an image projection device that can reduce axial chromatic aberration and improve the image quality of an image when the brightness of the image projection device is increased, particularly with a long focus lens.

A projection lens system of the present disclosure is a projection optical system including a plurality of lens groups, the plurality of lens groups each including one or more lenses and moving such that an interval between the lens groups changes during a zooming action, the projection lens system including a first lens group disposed closest to a magnification side, the first lens group having positive power, wherein the first lens group includes one negative lens satisfying following conditions (1) and (2):

$$0.0005 < \Delta pgfn < 0.01 \quad (1)$$

$$32 < vdn < 45 \quad (2)$$

where $\Delta pgfn = (ngn-nfn)/(nfn-ncn) - (-2.20599 \times 10^{-3} \times vdn + 6.69612 \times 10^{-1})$, vdn is Abbe number of negative lens,
ngn is a refractive index of the negative lens to g-line,
nfn is a refractive index of the negative lens to F-line, and
ncn is a refractive index of the negative lens to C-line.

According to the projection lens system and the image projection device of the present disclosure, it is possible to reduce axial chromatic aberration and improve an image quality of an image when brightness of the image projection device is increased.

DESCRIPTION OF EMBODIMENTS

Hereinafter, the embodiments will be described in detail with reference to the drawings as appropriate. However, more detailed description than necessary may be omitted. For example, detailed descriptions of already well-known matters or duplicate descriptions of substantially the same configurations may be omitted. This is to avoid unnecessary redundancy in the following description and to facilitate understanding by those skilled in the art.

It should be noted that the applicant provides the accompanying drawings and the following description so that those skilled in the art can sufficiently understand the present disclosure, and they are not intended to limit the subject matter set forth in the claims.

Figure 1:
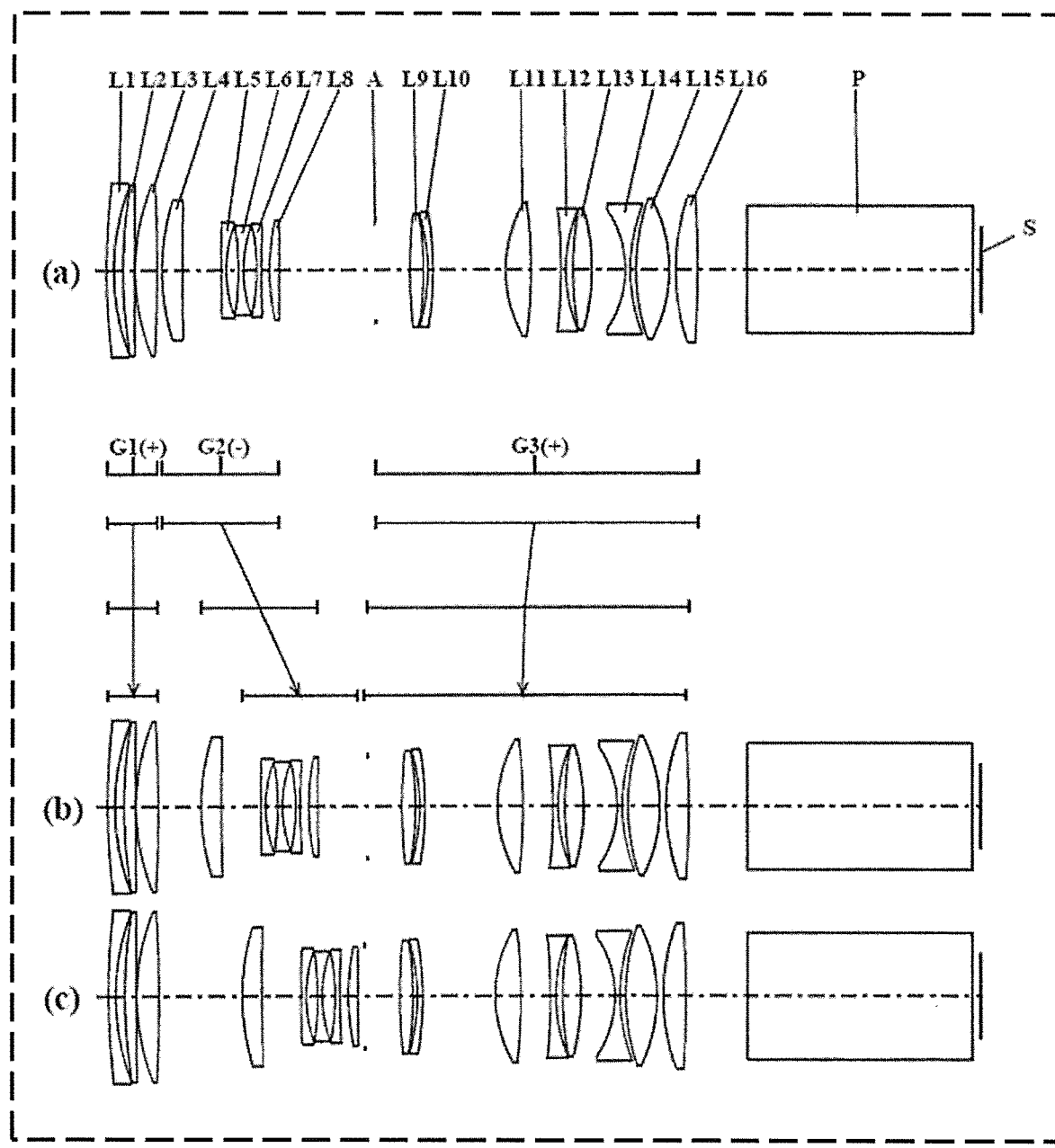
FIG. 1 shows lens layout diagrams each illustrating an infinity focus state of a projection lens system of a first embodiment.
Figure 3:
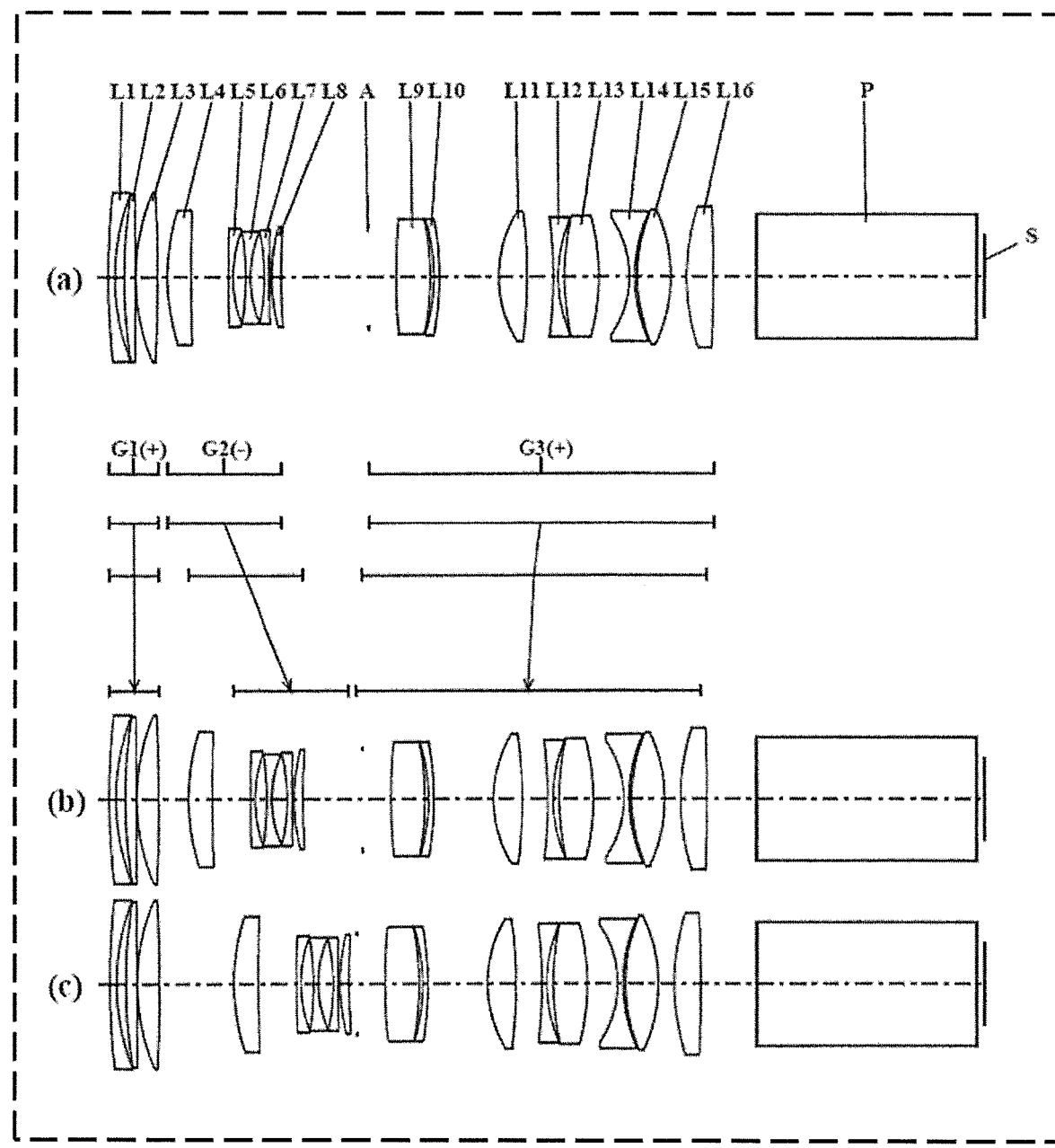
FIG. 3 shows lens layout diagrams each illustrating an infinity focus state of a projection lens system of a second embodiment.
Figure 5:
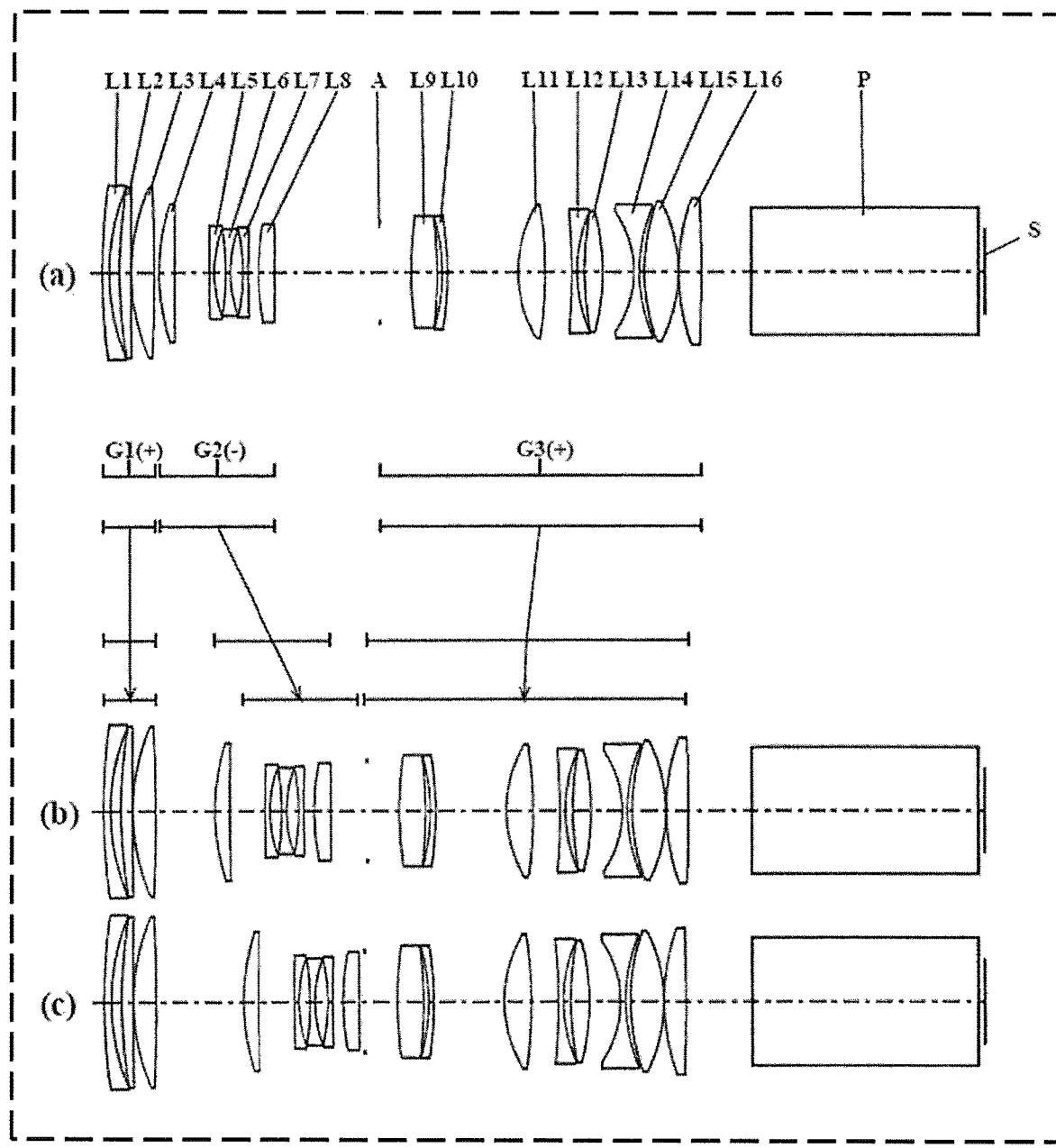
FIG. 5 shows lens layout diagrams each illustrating an infinity focus state of a projection lens system of a third embodiment.

FIGS. 1, 3, and 5 are lens layout diagrams of projection lens systems of first to third embodiments, and all show a zoom lens system in an infinity focus state. In each figure, (a), (b), and (c) show the lens configurations on a wide angle end, on an intermediate position, and on a telephoto end, respectively. The wide angle end refers to the shortest focal length state. The focal length in the shortest focal length state is fW. The telephoto end refers to the longest focal length state. The focal length in the longest focal length state is fT. The intermediate position refers to an intermediate focal length state. Focal length fm in the intermediate focal length state is prescribed by the following equation [Equation 1].

$$fm = \sqrt{(f_W * f_T)} \quad \text{[Equation 1]}$$

In addition, in FIGS. 1, 3, and 5, the line arrows provided between (a) and (b) are lines obtained by connecting the positions of the lens groups in each state on the wide angle end, the intermediate position, and the telephoto end in this order from the top. The wide angle end and the intermediate position and the intermediate position and the telephoto end are simply connected by a straight line, which is different from the actual movement of each lens group. In each drawing, the left side is a magnification side and the right side is a reduction side. Further, in each drawing, symbols (+) and (−) attached to the reference signs of the respective lens groups correspond to the reference signs of a power of the respective lens groups. In each figure, the position of original image S is shown on the rightmost side. On the left side of original image S, optical element P such as a prism for color separation and color synthesis, an optical filter, a parallel plate glass, a crystal low pass filter, an infrared cut filter, or the like is shown.

Figure 2:
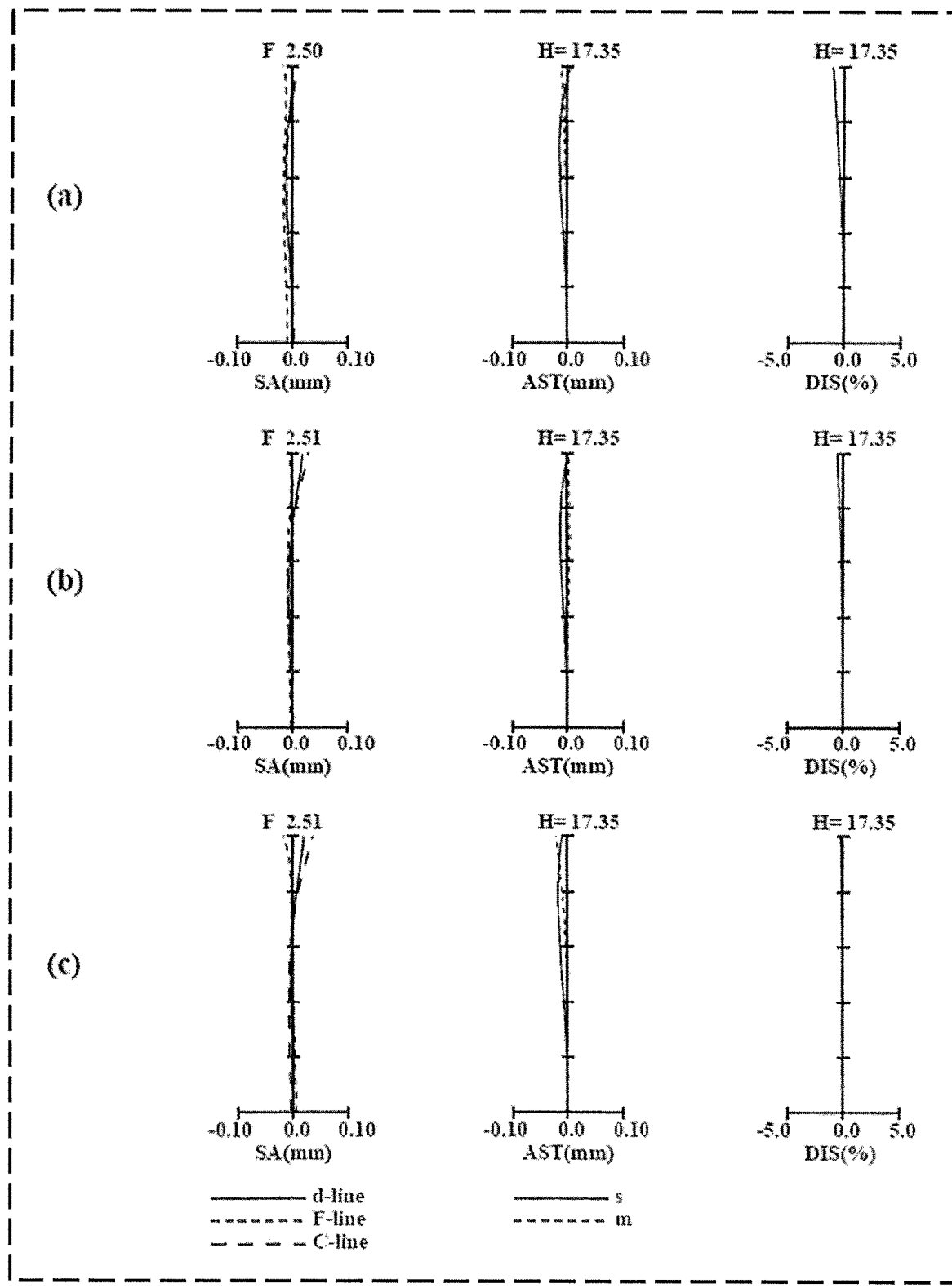
FIG. 2 shows longitudinal aberration diagrams of the projection lens system of the first embodiment when an object distance is infinity.
Figure 4:
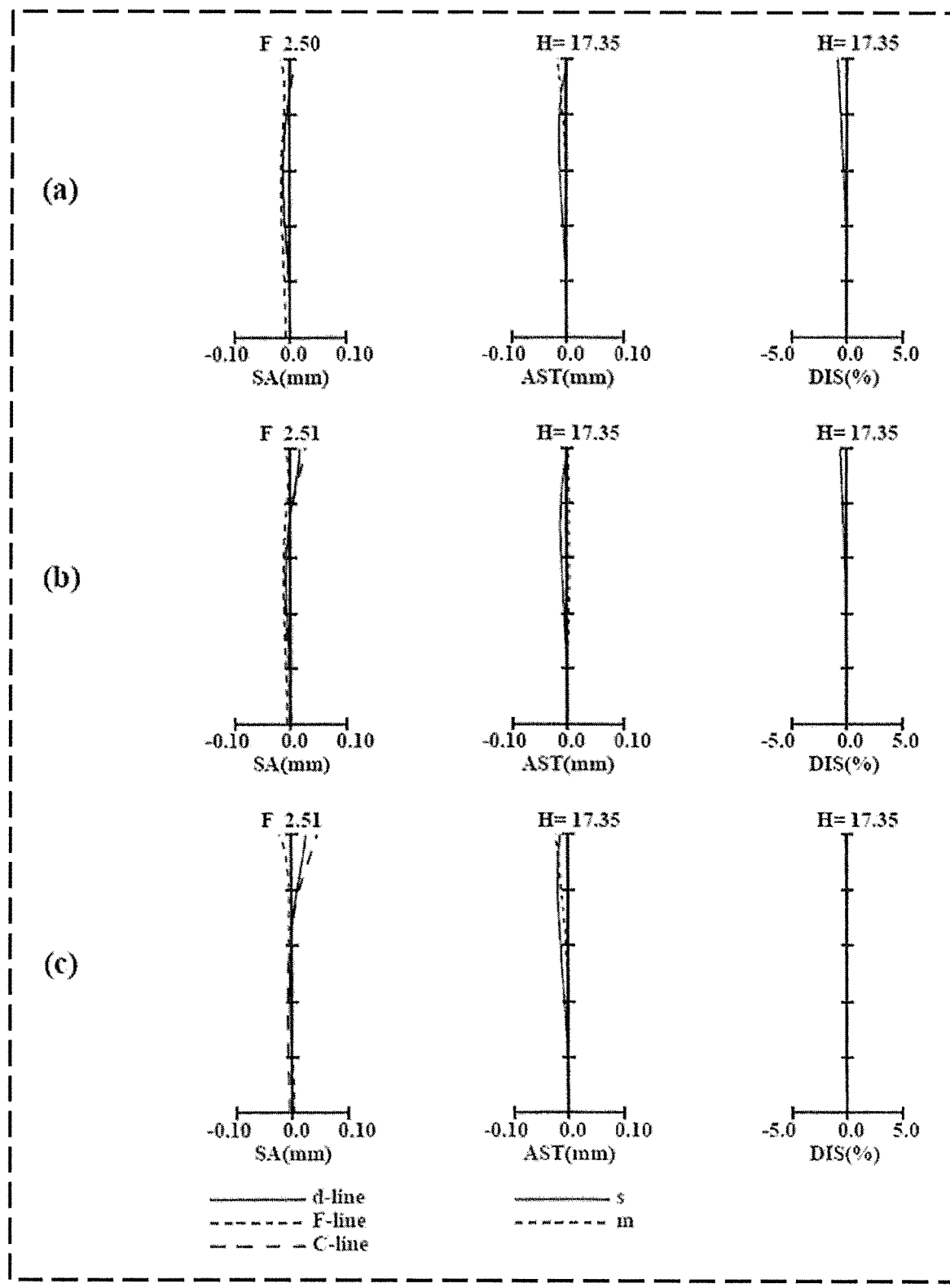
FIG. 4 shows longitudinal aberration diagrams of the projection lens system of the second embodiment when the object distance is infinity.
Figure 6:
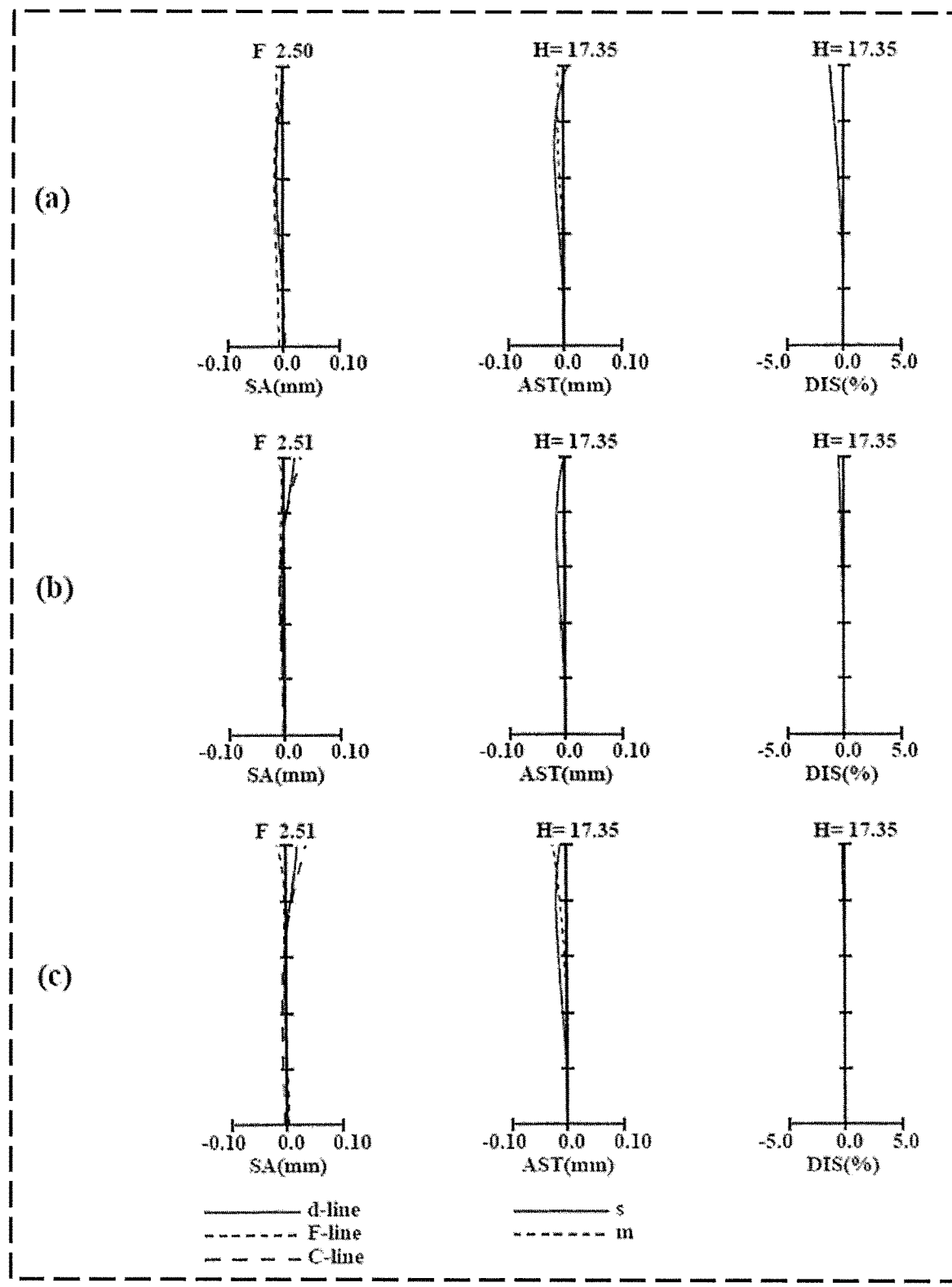
FIG. 6 shows longitudinal aberration diagrams of the projection lens system of the third embodiment when the object distance is infinity.

FIGS. 2, 4, and 6 are longitudinal aberration diagrams when the object distance of the projection lens systems of the first to third embodiments is infinity. The marks (a), (b), and (c) in each drawing are aberration diagrams when the focal length of the imaging optical system of the present disclosure is on a wide angle end, on an intermediate position, and on a telephoto end, respectively.

In each longitudinal aberration diagram, a spherical aberration diagram, an astigmatism diagram, and a distortion diagram are shown in order from the left side. In the spherical aberration diagram, the lateral axis represents spherical aberration (SA (mm)), and the vertical axis represents F-number (marked with F in the drawing). In the spherical aberration diagram, the solid line, short-dash line, and long-dash line represent the characteristics of d-line, F-line, and C-line, respectively. In the astigmatism diagram, the lateral axis represents the astigmatism (AST mm), and the vertical axis represents an image height (marked with H in the drawing). In the astigmatism diagram, the solid line shows the characteristics of sagittal plane (marked with s in the drawing), and the broken line shows the characteristics of meridional plane (marked with m in the drawing). In the distortion diagram, the lateral axis represents a distortion (DIS (%)), and the vertical axis represents an image height (marked with H in the drawing).

Figure 7:
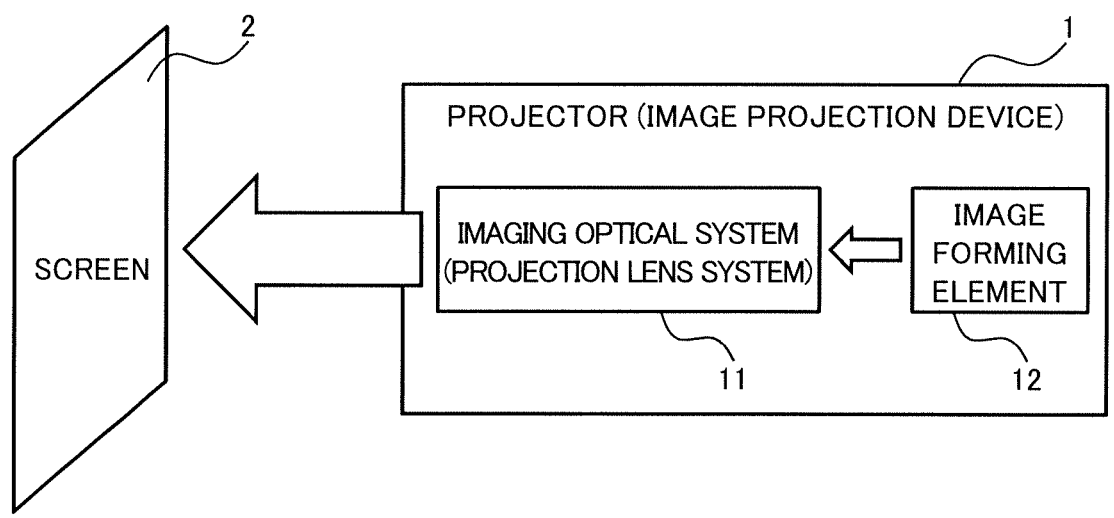
FIG. 7 is a block diagram illustrating a configuration of an image projection device according to an embodiment of the present disclosure.

In the following embodiments, as illustrated in FIG. 7, the case where the projection lens system as imaging optical system 11 is applied to projector 1 (image projection device) for projecting an original image formed by image forming element 12 such as liquid crystal or Digital Micromirror Device (DMD) onto a screen is described. In the embodiment of the present disclosure, screen 2 is disposed on an extension line on the magnification side, for example. Imaging optical system 11 magnifies original image S of a liquid crystal panel or the like disposed on the reduction side to project the image onto screen 2.

The projection lens system of the present disclosure includes first lens group G1 having positive power, second lens group G2 having negative power, and third lens group G3 having positive power in this order from the magnification side to the reduction side.

First lens group G1 includes, in order from the magnification side to the reduction side, first lens L1 which is negative meniscus with a convex surface placed toward the magnification side, second lens L2 which is positive meniscus with a convex surface placed toward the magnification side, and third lens L3 which is biconvex.

Second lens group G2 includes, in order from the magnification side to the reduction side, fourth lens L4 which is positive meniscus with a convex surface placed toward the magnification side, fifth lens L5 which is negative meniscus with a convex surface placed toward the magnification side, sixth lens L6 which is biconcave, seventh lens L7 which is biconcave, and eighth lens L8 which is positive meniscus with a convex surface placed toward the magnification side.

Third lens group G3 is composed of aperture diaphragm A and lenses from ninth lens L9 to sixteenth lens L16. Third lens group G3 includes, in order from the magnification side to the reduction side, ninth lens L9 which is biconvex, tenth lens L10 which is negative meniscus with a convex surface placed toward the reduction side, eleventh lens L11 which is biconvex, twelfth lens L12 which is biconcave, thirteenth lens L13 which is biconvex, fourteenth lens L14 which is biconcave, fifteenth lens L15 which is biconvex, and sixteenth lens L16 which is biconvex.

Optical element P is disposed between third lens group G3 and original image S.

When the imaging optical system zooms from the wide angle end to the telephoto end, first lens group G1 is relatively fixed with respect to an image plane of original image S. Second lens group G2 simply moves toward the reduction side with respect to the image plane of original image S. Third lens group G3 moves toward the magnification side with respect to the image plane of original image S.

All lens groups move to the magnification side along the optical axis during an action of focusing from an infinite focus state to a proximate focus state.

The projection lens system of the present embodiment is a projection lens system having a plurality of lens groups that include one or more lenses and that move such that the interval between the lens groups changes during a zooming action. The projection lens system includes first lens group G1 with positive power disposed closest to the magnification side, and has one negative lens in first lens group G1. The conditions satisfied by the projection lens system are shown below.

The negative lens of the projection lens system of the present disclosure satisfies following condition (1):

$$0.0005 < \Delta pgfn < 0.01 \tag{1}$$

where $$\Delta pgfn = (ngn - nfn)/(nfn - ncn) - (-2.20599 \times 10^{-3} \times vdn + 6.69612 \times 10^{-1}),$$

vdn is Abbe number of negative lens,
ngn is a refractive index of negative lens for g-line,
nfn is a refractive index of negative lens for F-line, and
ncn is a refractive index of negative lens for C-line.

Condition (1) prescribes the partial dispersion ratio between the g-line and the F-line of the negative lens in first lens group G1. At high brightness, performance degradation occurs due to the influence of lens shape change. In order to suppress the performance degradation, a positive lens is provided with a glass material having a negative temperature coefficient, which has an effect opposite to the effect of the shape change. However, the negative temperature coefficient glass material is a so-called anomalous dispersion glass. In the long focus lens in particular, the width of the light ray with respect to the effective diameter is wide, and thus many lenses affect the performance degradation due to the lens shape change. Then, the number of positive anomalous dispersion glasses to be used increases. Then, it becomes difficult to correct the axial chromatic aberration of each wavelength. Therefore, satisfying condition (1) makes it possible to suppress axial chromatic aberration at each wavelength adequately. Falling below a lower limit of condition (1) causes increase in axial chromatic aberration at wide angle end. On the other hand, excess over an upper limit of condition (1) causes increase in axial chromatic aberration at telephoto end.

The imaging optical system of the present disclosure satisfies following condition (2).

$$32 < vdn < 45 \tag{2}$$

Condition (2) prescribes the Abbe number of the negative lens in first lens group G1. By satisfying condition (2), axial chromatic aberration can be suppressed. Falling below a lower limit of condition (2) causes axial chromatic aberration on the short wavelength side over, so that the axial chromatic aberration increases. On the other hand, excess over an upper limit causes axial chromatic aberration on the short wavelength side under, so that the axial chromatic aberration increases.

The projection lens system of the present disclosure satisfies following condition (3):

$$0.8 < |fn/f1| < 1.5 \quad (3)$$

where fn is a focal length of the negative lens in first lens group G1, and f1 is a focal length of first lens group G1.

Condition (3) prescribes the focal length of the negative lens in first lens group G1. Satisfaction of condition (3) can achieve this advantage: correcting spherical aberration. Falling below a lower limit of condition (3) causes spherical aberration under, so that it becomes impossible to sufficiently correct the spherical aberration. On the other hand, excess over an upper limit causes spherical aberration over, so that it becomes impossible to sufficiently correct the spherical aberration.

Satisfaction of the following condition (3a) can more positively achieve the foregoing advantage.

$$1.0 < |fn/f1| < 1.3 \quad (3a)$$

The projection lens system of the present disclosure satisfies following condition (4):

$$1.0 < f1/ft < 2.0 \quad (4)$$

where ft is a focal length at telephoto end when projection distance is infinity.

Condition (4) prescribes the focal length of first lens group G1. Satisfaction of condition (4) can achieve this advantage: reducing the total length and suppressing spherical aberration. Excess over an upper limit of condition (4) causes increase in the total length. On the other hand, falling below a lower limit causes generation of spherical aberration.

Satisfaction of the following condition (4a) can more positively achieve the foregoing advantage.

$$1.2 < f1/ft < 1.6 \quad (4a)$$

In the projection lens system of the present disclosure, first lens group G1 has at least one positive lens and satisfies following condition (5):

$$dn1/dt < -4.5 \times 10^{-6} \quad (5)$$

where dn1/dt is a refractive index-temperature coefficient of a material of the positive lens of first lens group G1 at normal temperature. The normal temperature is 20° C. to 30° C., for example.

Condition (5) prescribes the refractive index-temperature coefficient. Excess over an upper limit of condition (5) causes difficulty in cancelling out the influence of shape change and the influence of changes in the refractive index, for example in a case of the focus position shift due to local temperature change arising at high brightness, so that focusing sensitivity shifts during high brightness.

The projection lens system of the present disclosure has second lens group G2 disposed closer to the reduction side of first lens group G1, and second lens group G2 has positive power and satisfies following condition (6):

$$0.2 < |f2/ft| < 0.7 \quad (6)$$

where f2 is a focal length of second lens group G2.

Condition (6) prescribes the focal length of second lens group G2. Satisfaction of condition (6) can achieve this advantage: shortening the total length and reducing the sensitivity to eccentricity. Excess over an upper limit of condition (6) causes increase in the total length. On the other hand, falling below a lower limit of condition (6) causes increase in the sensitivity of second lens group G2 to eccentricity.

Satisfaction of the following condition (6a) can more positively achieve the foregoing advantage.

$$0.3 < |f2/ft| < 0.6 \quad (6a)$$

The projection lens system of the present disclosure has third lens group G3 disposed closer to the reduction side of second lens group G2, and third lens group G3 has positive power and satisfies following condition (7):

$$0.3 < f3/ft < 1.0 \quad (7)$$

where f3 is a focal length of third lens group G3.

Condition (7) prescribes the focal length of third lens group G3. Satisfaction of condition (7) can achieve this advantage: reducing the total length and reducing the sensitivity to eccentricity. Falling below a lower limit of condition (7) causes increase in the sensitivity to eccentricity. On the other hand, excess over an upper limit causes increase in the total length.

Satisfaction of the following condition (7a) can more positively achieve the foregoing advantage.

$$0.5 < f3/ft < 0.8 \quad (7a)$$

In the projection lens system of the present disclosure, the positive lens is disposed closest to the magnification side of second lens group G2 and satisfies following condition (8):

$$0.0005 < \Delta pgfp < 0.01 \quad (8)$$

where $$\Delta pgfp = (ngp - nfp)/(nfp - ncp) - (-2.20599 \times 10^{-3} \times vdp + 6.69612 \times 10^{-1}),$$

vdp is Abbe number of negative lens, ngp is a refractive index of negative lens for g-line, nfp is a refractive index of negative lens for F-line, and ncp is a refractive index of negative lens for C-line.

Condition (8) prescribes a partial dispersion ratio between the g-line and the F-line of the positive lens disposed closest to the magnification in second lens group G2. Satisfaction of condition (8) can achieve this advantage: suppressing axial chromatic aberration. Falling below a lower limit of condition (8) causes invite increase in axial chromatic aberration at telephoto end. On the other hand, excess over an upper limit of condition (8) causes increase in the axial chromatic aberration at wide angle end.

The projection lens system of the present disclosure satisfies following condition (9).

$$32 < vdp < 45 \quad (9)$$

Condition (9) prescribes the Abbe number of the positive lens disposed closest to the magnification side in second lens group G2. Satisfaction of condition (9) can achieve this advantage: suppressing axial chromatic aberration. Falling below a lower limit of condition (9) causes generation of axial chromatic aberration on the short wavelength side under, so that the axial chromatic aberration increases. On the other hand, excess over an upper limit causes excess generation of axial chromatic aberration on the short wavelength side, so that the axial chromatic aberration increases.

In the projection lens system of the present disclosure, at least five positive lenses are included in third lens group G3, and at least five positive lenses satisfy following condition (10):

$$dn3/dt < -4.5 \times 10^{-6} \quad (10)$$

where dn3/dt is a refractive index-temperature coefficient of a material of the positive lens of third lens group G3 at normal temperature. The normal temperature is 20° C. to 30° C., for example.

Condition (10) prescribes the temperature coefficient of refractive index. Excess over an upper limit of condition (10) causes difficulty in cancelling out the influence of shape change and the influence of changes in the refractive index, for example in a case of the focus position shift due to local temperature changes arising at high brightness, so that focusing sensitivity shifts during high brightness.

As described above, the embodiment has been described as an example of the technique disclosed in the present application. However, the technology in the present disclosure is not limited to this, and can also be applied to embodiments in which changes, substitutions, additions, omissions, and the like have been made as appropriate.

Embodiments with numerical simulation of imaging optical systems of the first to third embodiments will be described below. In each embodiment with numerical simulation, all units of length in the table are "mm" and all units of angle of view are "°". In each embodiment with numerical simulation, r is curvature radius, d is spacing between adjacent surfaces, nd is a refractive index with respect to d line, and vd is Abbe number with respect to d line.

First Embodiment with Numerical Simulation

The lens data of the first embodiment are shown in Tables 1 to 3. Table 1 shows surface data. Table 2 shows various data. Table 3 shows zoom group data and single lens data.

TABLE 1

Surface data (First embodiment)

| Surface No. | r | d | nd | Vd |
|---|---|---|---|---|
| Object surface | ∞ | | | |
| 1 | 331.504 | 2.900 | 1.59270 | 35.4 |
| 2 | 105.508 | 3.670 | | |
| 3 | 216.617 | 4.746 | 1.49700 | 81.6 |
| 4 | 4352.007 | 0.200 | | |
| 5 | 93.901 | 9.560 | 1.49700 | 81.6 |
| 6 | −697.051 | Variable | | |
| 7 | 98.815 | 8.530 | 1.59270 | 35.4 |
| 8 | 1301.894 | 16.459 | | |
| 9 | 1167.887 | 2.000 | 1.48749 | 70.4 |
| 10 | 58.216 | 4.911 | | |
| 11 | −124.358 | 2.000 | 1.48749 | 70.4 |
| 12 | 54.578 | 5.674 | | |
| 13 | −83.067 | 2.000 | 1.48749 | 70.4 |
| 14 | 433.395 | 3.482 | | |
| 15 | 103.919 | 3.857 | 1.61800 | 63.4 |
| 16 | 1451.726 | Variable | | |
| 17 (diaphragm) | ∞ | 14.982 | | |
| 18 | 228.055 | 5.733 | 1.59282 | 68.6 |
| 19 | −136.309 | 1.873 | | |
| 20 | −81.892 | 2.200 | 1.67300 | 38.3 |
| 21 | −139.756 | 30.731 | | |
| 22 | 55.722 | 11.015 | 1.49700 | 81.6 |
| 23 | −214.040 | 12.331 | | |
| 24 | −240.897 | 2.200 | 1.74330 | 49.2 |
| 25 | 66.509 | 2.908 | | |
| 26 | 130.570 | 7.715 | 1.59282 | 68.6 |
| 27 | −96.970 | 14.043 | | |
| 28 | −44.440 | 2.200 | 1.51823 | 58.9 |
| 29 | 73.917 | 2.421 | | |
| 30 | 89.203 | 13.182 | 1.49700 | 81.6 |
| 31 | −67.925 | 2.425 | | |
| 32 | 93.576 | 9.258 | 1.59282 | 68.6 |
| 33 | −604.424 | Variable | | |
| 34 | ∞ | 95.000 | 1.51680 | 64.2 |

TABLE 2

Various data (First embodiment)

| | Wide angle | Intermediate | Telephoto |
|---|---|---|---|
| Focal length | 96.104 | 121.346 | 153.324 |
| F number | 2.501 | 2.509 | 2.512 |
| Angle of view | 10.338 | 8.181 | 6.470 |
| Image height | 17.350 | 17.350 | 17.350 |
| d6 | 2.000 | 18.014 | 34.713 |
| d16 | 40.628 | 20.706 | 2.748 |
| d33 | 21.142 | 25.051 | 26.309 |

TABLE 3

Zoom group data and Single lens data (First embodiment)

| Zoom group | | | Single lens | | |
|---|---|---|---|---|---|
| | Focal length | | First surface | Focal length | Lens material | dn/dt [10⁻⁶] |
| G1 | 223.462 | L1 | 1 | −262.370 | FF5 | 0.8 |
| | | L2 | 3 | 458.507 | FCD1 | −6.2 |
| | | L3 | 5 | 167.177 | FCD1 | −6.2 |
| G2 | −73.586 | L4 | 7 | 179.939 | FF5 | 0.8 |
| | | L5 | 9 | −125.760 | FC5 | −1.4 |
| | | L6 | 11 | −77.525 | FC5 | −1.4 |
| | | L7 | 13 | −142.809 | FC5 | −1.4 |
| | | L8 | 15 | 180.922 | PCD4 | −2.2 |
| G3 | 99.026 | L9 | 18 | 144.762 | FCD515 | −5.7 |
| | | L10 | 20 | −298.457 | SNBH52V | 3.8 |
| | | L11 | 22 | 90.180 | FCD1 | −6.2 |
| | | L12 | 24 | −69.906 | NBF1 | 7.9 |
| | | L13 | 26 | 95.064 | FCD515 | −5.7 |
| | | L14 | 28 | −53.218 | SNSL3 | 0.7 |
| | | L15 | 30 | 79.812 | FCD1 | −6.2 |
| | | L16 | 32 | 137.365 | FCD515 | −5.7 |

Second Embodiment with Numerical Simulation

Lens data of the second embodiment are shown in Tables 4 to 6. Table 4 shows surface data. Table 5 shows various data. Table 6 shows zoom group data and single lens data.

TABLE 4

Surface data (Second embodiment)

| Surface No. | r | d | nd | Vd |
|---|---|---|---|---|
| Object surface | ∞ | | | |
| 1 | 343.326 | 2.900 | 1.59270 | 35.3 |
| 2 | 104.407 | 3.826 | | |
| 3 | 223.282 | 4.777 | 1.49700 | 81.6 |
| 4 | 24532.389 | 0.200 | | |
| 5 | 92.876 | 9.797 | 1.49700 | 81.6 |
| 6 | −620.634 | Variable | | |
| 7 | 96.948 | 10.521 | 1.59270 | 35.3 |
| 8 | 1004.855 | 16.386 | | |
| 9 | 896.379 | 2.000 | 1.48749 | 70.4 |
| 10 | 58.337 | 5.368 | | |
| 11 | −124.437 | 2.000 | 1.48749 | 70.4 |
| 12 | 51.137 | 6.455 | | |
| 13 | −81.968 | 2.000 | 1.48749 | 70.4 |
| 14 | 646.363 | 1.050 | | |
| 15 | 88.685 | 3.842 | 1.62041 | 60.3 |
| 16 | 349.302 | Variable | | |
| 17 (diaphragm) | ∞ | 12.220 | | |
| 18 | 260.012 | 15.000 | 1.59282 | 68.6 |
| 19 | −117.028 | 1.687 | | |
| 20 | −80.318 | 2.200 | 1.67300 | 38.3 |
| 21 | −140.353 | 25.798 | | |
| 22 | 55.081 | 12.252 | 1.49700 | 81.6 |
| 23 | −210.792 | 11.499 | | |

TABLE 4-continued

Surface data (Second embodiment)

| Surface No. | r | d | nd | Vd |
|---|---|---|---|---|
| 24 | −210.629 | 2.200 | 1.71700 | 47.9 |
| 25 | 65.081 | 2.739 | | |
| 26 | 116.664 | 14.972 | 1.59282 | 68.6 |
| 27 | −98.585 | 13.341 | | |
| 28 | −44.320 | 2.200 | 1.51680 | 64.2 |
| 29 | 67.800 | 1.191 | | |
| 30 | 74.079 | 14.081 | 1.49700 | 81.6 |
| 31 | −68.602 | 6.817 | | |
| 32 | 97.392 | 11.549 | 1.59282 | 68.6 |
| 33 | −882.068 | Variable | | |
| 34 | ∞ | 95.000 | 1.51680 | 64.2 |

TABLE 5

Various data (Second embodiment)

| | Wide angle | Intermediate | Telephoto |
|---|---|---|---|
| Focal length | 105.656 | 121.368 | 162.890 |
| F number | 2.501 | 2.506 | 2.512 |
| Angle of view | 9.406 | 8.184 | 6.091 |
| Image height | 17.350 | 17.350 | 17.350 |
| d6 | 4.030 | 12.833 | 32.371 |
| d16 | 37.267 | 25.577 | 3.126 |
| d33 | 18.199 | 21.086 | 23.999 |

TABLE 6

Zoom group data and Single lens data (Second embodiment)

| Zoom group | | | Single lens | | | |
|---|---|---|---|---|---|---|
| | Focal length | | First surface | Focal length | Lens material | dn/dt [10⁻⁶] |
| G1 | 220.28 | L1 | 1 | −254.28 | SFTM16 | 0.2 |
| | | L2 | 3 | 453.36 | FCD1 | −6.2 |
| | | L3 | 5 | 163.29 | FCD1 | −6.2 |
| G2 | −70.71 | L4 | 7 | 180.26 | SFTM16 | 0.2 |
| | | L5 | 9 | −128.10 | FC5 | −1.4 |
| | | L6 | 11 | −74.07 | FC5 | −1.4 |
| | | L7 | 13 | −149.09 | FC5 | −1.4 |
| | | L8 | 15 | 190.51 | BACD16 | 2.4 |
| G3 | 100.87 | L9 | 18 | 138.18 | FCD515 | −5.7 |
| | | L10 | 20 | −283.18 | SNBH52V | 3.8 |
| | | L11 | 22 | 89.23 | FCD1 | −6.2 |
| | | L12 | 24 | −69.11 | LAF3 | 1.4 |
| | | L13 | 26 | 92.53 | FCD515 | −5.7 |
| | | L14 | 28 | −51.51 | BSC7 | 2.7 |
| | | L15 | 30 | 74.09 | FCD1 | −6.2 |
| | | L16 | 32 | 148.60 | FCD515 | −5.7 |

Third Embodiment with Numerical Simulation

Lens data of the third embodiment are shown in Tables 7 to 9. Table 7 shows surface data. Table 8 shows various data. Table 9 shows zoom group data and single lens data.

TABLE 7

Surface data (Third embodiment)

| Surface No. | r | d | nd | vd |
|---|---|---|---|---|
| Object surface | ∞ | | | |
| 1 | 276.904 | 2.900 | 1.59270 | 35.3 |
| 2 | 100.265 | 4.039 | | |
| 3 | 220.471 | 4.496 | 1.49700 | 81.6 |

TABLE 7-continued

Surface data (Third embodiment)

| Surface No. | r | d | nd | vd |
|---|---|---|---|---|
| 4 | 1896.404 | 0.200 | | |
| 5 | 90.627 | 9.778 | 1.49700 | 81.6 |
| 6 | −688.185 | Variable | | |
| 7 | 95.825 | 6.400 | 1.59270 | 35.3 |
| 8 | 1719.420 | 14.879 | | |
| 9 | 994.923 | 2.000 | 1.48749 | 70.4 |
| 10 | 56.692 | 4.753 | | |
| 11 | −117.050 | 2.000 | 1.48749 | 70.4 |
| 12 | 54.436 | 5.268 | | |
| 13 | −81.010 | 2.000 | 1.48749 | 70.4 |
| 14 | 408.826 | 4.449 | | |
| 15 | 107.458 | 6.741 | 1.61800 | 63.4 |
| 16 | 4116.797 | Variable | | |
| 17 (diaphragm) | ∞ | 13.647 | | |
| 18 | 184.893 | 11.000 | 1.59282 | 68.6 |
| 19 | −162.609 | 2.087 | | |
| 20 | −83.078 | 2.200 | 1.67300 | 38.3 |
| 21 | −139.302 | 29.616 | | |
| 22 | 56.238 | 11.133 | 1.49700 | 81.6 |
| 23 | −193.121 | 11.203 | | |
| 24 | −277.929 | 2.200 | 1.74330 | 49.2 |
| 25 | 64.250 | 3.068 | | |
| 26 | 128.551 | 7.638 | 1.59282 | 68.6 |
| 27 | −101.362 | 13.213 | | |
| 28 | −44.273 | 2.200 | 1.51823 | 58.9 |
| 29 | 73.020 | 1.996 | | |
| 30 | 85.360 | 13.792 | 1.49700 | 81.6 |
| 31 | −66.051 | 0.200 | | |
| 32 | 90.527 | 9.276 | 1.59282 | 68.6 |
| 33 | −897.559 | Variable | | |
| 34 | ∞ | 95.000 | 1.51680 | 64.2 |

TABLE 8

Various data (Third embodiment)

| | Wide angle | Intermediate | Telephoto |
|---|---|---|---|
| Focal length | 86.563 | 121.329 | 143.771 |
| F number | 2.498 | 2.509 | 2.512 |
| Angle of view | 11.474 | 8.178 | 6.899 |
| Image height | 17.350 | 17.350 | 17.350 |
| d6 | 2.000 | 24.860 | 36.609 |
| d16 | 43.888 | 15.395 | 2.549 |
| d33 | 20.426 | 26.060 | 27.157 |

TABLE 9

Zoom group data and Single lens data (Third embodiment)

| Zoom group | | | Single lens | | | |
|---|---|---|---|---|---|---|
| | Focal length | | First surface | Focal length | Lens material | dn/dt [10⁻⁶] |
| G1 | 219.64 | L1 | 1 | −266.82 | JF16 | 0.3 |
| | | L2 | 3 | 501.52 | FCD1 | −6.2 |
| | | L3 | 5 | 161.80 | FCD1 | −6.2 |
| G2 | −71.90 | L4 | 7 | 170.97 | JF16 | 0.3 |
| | | L5 | 9 | −123.41 | FC5 | −1.4 |
| | | L6 | 11 | −75.93 | FC5 | −1.4 |
| | | L7 | 13 | −138.51 | FC5 | −1.4 |
| | | L8 | 15 | 178.43 | PCD4 | −2.2 |
| G3 | 97.00 | L9 | 18 | 147.68 | FCD515 | −5.7 |
| | | L10 | 20 | −310.74 | SNBH52V | 3.8 |
| | | L11 | 22 | 88.95 | FCD1 | −6.2 |
| | | L12 | 24 | −70.02 | NBF1 | 7.9 |
| | | L13 | 26 | 96.80 | FCD515 | −5.7 |

TABLE 9-continued

Zoom group data and Single lens data (Third embodiment)

| Zoom group | | Single lens | | | |
|---|---|---|---|---|---|
| Focal length | | First surface | Focal length | Lens material | dn/dt [$10^{-6}$] |
| | L14 | 28 | -52.85 | SNSL3 | 0.7 |
| | L15 | 30 | 77.26 | FCD1 | -6.2 |
| | L16 | 32 | 139.20 | FCD515 | -5.7 |

The following Table 10 shows corresponding values for each condition in the lens system of each embodiment with numerical simulation.

TABLE 10

Values of Conditional Expressions

| Condition | First embodiment | Second embodiment | Third embodiment |
|---|---|---|---|
| (1) | 0.0013 | 0.0016 | 0.0018 |
| (2) | 35.45 | 35.31 | 35.27 |
| (3) | 1.174 | 1.154 | 1.215 |
| (4) | 1.46 | 1.35 | 1.53 |
| (5) | $-6.2 \times 10^{-6}$ | $-6.2 \times 10^{-6}$ | $-6.2 \times 10^{-6}$ |
| (6) | 0.48 | 0.43 | 0.50 |
| (7) | 0.65 | 0.62 | 0.67 |
| (8) | 0.0013 | 0.0016 | 0.0018 |
| (9) | 35.45 | 35.31 | 35.27 |
| (10) | $-6.2 \sim -5.7 \times 10^{-6}$ | $-6.2 \sim -5.7 \times 10^{-6}$ | $-6.2 \sim -5.7 \times 10^{-6}$ |

INDUSTRIAL APPLICABILITY

The present disclosure can be applied to an image projection device such as a projector, a digital still camera, a digital video camera, a surveillance camera in a surveillance system, a web camera, and a vehicle-mounted camera. The present disclosure is applicable particularly to an imaging optical system that requires high image quality such as a projector, a digital still camera system, and a digital video camera system.

REFERENCE SIGNS LIST

G1 First lens group
G2 Second lens group
G3 Third lens group
L1 First lens
L2 Second lens
L3 Third lens
L4 Fourth lens
L5 Fifth lens
L6 Sixth lens
L7 Seventh lens
L8 Eighth lens
L9 Ninth lens
L10 Tenth lens
L11 Eleventh lens
L12 Twelfth lens
L13 Thirteenth lens
L14 Fourteenth lens
L15 Fifteenth lens
L16 Sixteenth lens
A Aperture diaphragm
P Prism
S Original image

The invention claimed is:

1. A projection lens system comprising a plurality of lens groups, the plurality of lens groups each including one or more lenses and moving such that an interval between the lens groups changes during a zooming action,
   the projection lens system comprising a first lens group disposed closest to a magnification side, the first lens group having positive power,
   wherein the first lens group includes one negative lens satisfying following conditions (1) and (2):

$$0.0005 < \Delta pgfn < 0.01 \tag{1}$$

$$32 < vdn < 45 \tag{2}$$

where $\Delta pgfn = (ngn-nfn)/(nfn-ncn) - (-2.20599 \times 10^{-3} \times vdn + 6.69612 \times 10^{-1})$, vdn is Abbe number of the negative lens,
ngn is a refractive index of the negative lens to g-line,
nfn is a refractive index of the negative lens to F-line, and
ncn is a refractive index of the negative lens to C-line,
the projection lens system further comprising: a second lens group disposed closer to a reduction side of the first lens group, the second lens group having negative power; and
a third lens group disposed closer to a reduction side of the second lens group, the third lens group having positive power,
wherein a lens of the second lens group disposed closest to the magnification side has positive power.

2. The projection lens system according to claim 1, satisfying the following condition (3):

$$0.8 < |fn/f1| < 1.5 \tag{3}$$

where fn is a focal length of the negative lens, and
f1 is a focal length of the first lens group.

3. The projection lens system according to claim 1, satisfying the following condition (4):

$$1.0 < f1/ft < 2.0 \tag{4}$$

where
ft is a focal length when a projection distance of an entire system at a telephoto end is infinity, and
f1 is a focal length of the first lens group.

4. The projection lens system according to claim 1, wherein the first lens group includes at least one positive lens, and satisfies following condition (5):

$$dn1/dt < -4.5 \times 10^{-6} \tag{5}$$

where dn1/dt is a relative refractive index-temperature coefficient of a material of the positive lens of the first lens group at normal temperature, which is 20° C. to 30° C., based on a refractive index of the positive lens to d-line.

5. The projection lens system according to claim 1, satisfying the following condition (6):

$$0.2 < |f2/ft| < 0.7 \tag{6}$$

where f2 is a focal length of the second lens group.

6. The projection lens system according to claim 1, satisfying the following condition (7):

$$0.3 < f3/ft < 1.0 \tag{7}$$

where f3 is a focal length of the third lens group.

7. The projection lens system according to claim 1, wherein the lens of the second lens group disposed closest to the magnification side satisfies following conditional expressions:

$$0.0005 < \Delta pgfp < 0.01 \quad (8)$$

$$32 < vdp < 45 \quad (9)$$

$$\text{where } \Delta pgfp = (ngp-nfp)/(nfp-ncp)-(-2.20599\times10^{-3}\times vdp+6.69612\times10^{-1}), \quad (10)$$

vdp is Abbe number of the lens of the second lens group disposed closest to the magnification side, ngp is a refractive index for g-line, of the lens of the second lens group disposed closest to the magnification side, nfp is a refractive index for F-line, of the lens of the second lens group disposed closest to the magnification side, and ncp is a refractive index for C-line, of the lens of the second lens group disposed closest to the magnification side.

8. The projection lens system according to claim 1, wherein the third lens group includes at least five positive lenses of that satisfy following condition:

$$dn3/dt < -4.5\times10^{-6} \quad (10)$$

where dn3/dt is a relative refractive index-temperature coefficient of a material of the positive lens of the third lens group at normal temperature, which is 20° C. to 30° C., based on a refractive index of the positive lens to d-line.

9. The projection lens system according to claim 1, wherein the first lens group includes the negative lens having negative power, a first positive lens having positive power, and a second positive lens having positive power which are arranged in order from the magnification side.

10. An image projection device comprising:

the projection lens system according to claim 1; and an image forming element to generate an image to be projected onto a screen.

\* \* \* \* \*